United States Patent [19]
DePaoli

[11] Patent Number: 5,205,044
[45] Date of Patent: Apr. 27, 1993

[54] LUMINOUS DOT SIGHTING INSTRUMENT

[76] Inventor: Alfred C. DePaoli, 1 Wyman St., Woburn, Mass. 01801

[21] Appl. No.: 790,338

[22] Filed: Nov. 12, 1991

[51] Int. Cl.⁵ ............................................. G02B 27/34
[52] U.S. Cl. ...................................... 33/243; 33/241; 42/103
[58] Field of Search ........................ 33/241, 243, 261; 356/248, 255, 253, 254, 251; 42/103, 100

[56] References Cited

U.S. PATENT DOCUMENTS

| | | | |
|---|---|---|---|
| 3,320,671 | 5/1967 | Rickert et al. | 33/241 |
| 3,552,819 | 1/1971 | Mandler | 33/241 |
| 3,942,901 | 3/1976 | Ekstrand | 356/251 |
| 3,960,453 | 6/1976 | Svensson | 33/241 |
| 3,963,356 | 6/1976 | Wiklund | 33/241 |
| 4,136,963 | 1/1979 | Budden et al. | 33/241 |
| 4,346,995 | 8/1982 | Morris | 356/251 |
| 4,658,139 | 4/1987 | Brennan et al. | 33/241 |
| 4,764,011 | 8/1988 | Goldstein | 33/241 |
| 4,877,324 | 10/1989 | Hauri et al. | 33/241 |
| 5,052,801 | 10/1991 | Downes, Jr. et al. | 33/246 |

FOREIGN PATENT DOCUMENTS 8002069 10/1980 PCT Int'l Appl. .

Primary Examiner—William A. Cuchlinski, Jr.
Assistant Examiner—William C. Dowling
Attorney, Agent, or Firm—Robert T. Dunn

[57] ABSTRACT

In a luminous dot sighting instrument: dots of different color are produced using different mirror coatings that differentially reflect different wavelengths of light from a single diode or several diodes of the same color, or from different color diodes; dots at different positions on the image of the target view of the instrument are obtained by spacing apart mirror coatings for reflecting light from a single diode, or by by spacing apart several diodes, or a combination of both; dots of different brightness on the image of the target view are obtained by spacing apart mirror coatings for reflecting light from a single diode so that light reflects from the near side and from the far side of the lens and so the far side reflected light is less bright on the image than the near side reflected light; and some embodiments incorporate more than one or all of these features.

11 Claims, 4 Drawing Sheets

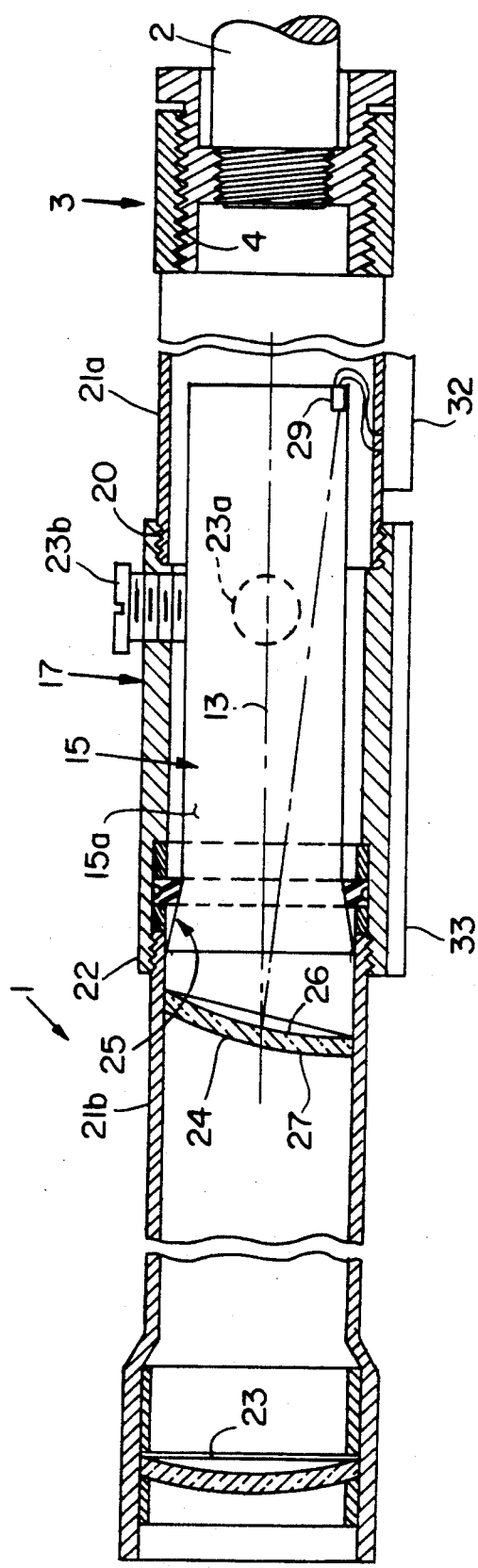
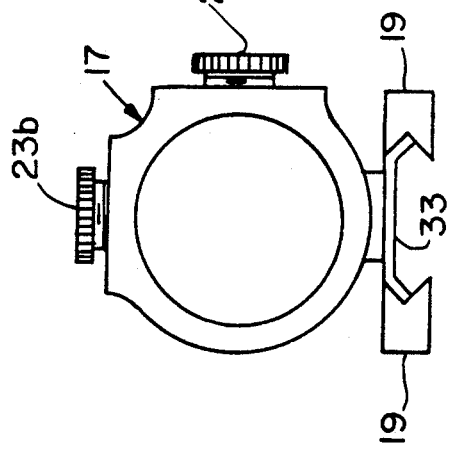
FIG. 1A
FIG. 1B

LUMINOUS DOT SIGHTING INSTRUMENT

BACKGROUND OF THE INVENTION

This invention relates to luminous dot sighting instruments and more particularly to such instruments used in connection with a telescope on a firearm as an aid to sighting the firearm on a target.

Optical sighting instruments having a sighting tube that often contains a telescope have used cross hairs to define the optical center of the instrument, and the user, such as a firearm marksman, places the cross hairs on the target in the view to aim the firearm. Clearly, the cross hairs are illuminated by light from the view. At twilight, in haze or fog and at other times when visibility is low, the cross hairs are difficult to see, and at night they cannot be seen at all. One solution to this problem has been the luminous dot sighting instrument.

A luminous dot sighting instrument is used to view a target and may be attached to a rifle or other firearm to sight the rifle on the target. The luminous dot is generated inside the instrument and is superimposed on the view of the target and serves the purpose of cross hairs. It does not depend on light from the view and can be made as bright as desired by the user. Often the luminous dot sighting instrument is used in conjunction with a telescope and along with the telescope is attached to a rifle to aid the marksman in pointing the rifle to hit the target viewed through the instrument and the telescope.

In a reflex type luminous dot sighting instrument, light is projected from a luminous source, such as a light emitting diode (LED) contained in the instrument, onto an inclined lens having a mirror coating so that light from the view passing through the lens is joined by light from the diode that reflects from the mirror coating. The marksman sees the target view with the luminous dot at the center and points the rifle to place the dot on the target in the view and fires the rifle. With a properly mounted and adjusted sighting instrument the marksman can quickly view the target area, put the dot on the target and fire the rifle with great accuracy.

Heretofore, a number of reflex type luminous dot sighting instruments, some with telescopes and some without, have been used with adjustments for range and windage to be made by the firearm marksman. The adjustments for range and windage are adjustments in elevation angle and azimuth angle, respectively, of the instrument with respect to the firearm and are set by the marksman using his estimates of range and windage. In all of these, the target view and the luminous dot are combined by the inclined lens with a mirror coating and light from the target view passes through the inclined lens while light from the LED that forms the luminous dot reflects from the lens mirror coating. The light for the luminous dot is preferably from a point source and is focused by the lens mirror on the same image plane as the target view so that the marksman sees the target view and the luminous dot all in focus at the same plane with the luminous dot precisely at the center of the target view. Often an LED emitting red light is used and it is enclosed by an aperture that directs the red light as a narrow angular cone to the center of the inclined lens. Thus, the luminous dot appears to the marksman the same size, shape and color for all target views, at the center of the target view, whether the target is far or near (long or short range) and whether there is any adjustment for windage, left or right.

SUMMARY OF THE INVENTION

It is an object of the present invention to provide a luminous dot sighting instrument wherein there is a selection of the dot position, brightness or color giving the marksman additional options for sighting and/or aiding the marksman to sight more quickly and accurately on a target.

It is a further object of the present invention to provide such a luminous dot sighting instrument wherein the selection of the dot position, brightness or color gives the marksman additional options for sighting to account for range and/or windage.

It is a further object of the present invention to provide such a luminous dot sighting instrument wherein the selection of the dot position, brightness or color to aid the marksman to sight more quickly and accurately on a target and account for range and/or windage.

It is another object of the present invention to provide a luminous dot sighting instrument with multiple dots of different colors at the same or at spaced apart points on the image of the target view giving the marksman additional options for sighting and/or aiding the marksman to sight more quickly and accurately on a target.

It is a further object of the present invention to provide the multiple dots of different colors at the same or at spaced apart points on the image of the target view wherein the selection of the dot position, brightness or color gives the marksman additional options for sighting to account for range and/or windage.

It is a further object of the present invention to provide the multiple dots of different colors at the same or at spaced apart points on the image of the target view to aid the marksman to sight more quickly and accurately on a target and account for range and/or windage.

It is another object of the present invention to provide a luminous dot sighting instrument with variable dots to account for range and/or windage.

It is another object of the present invention to provide a luminous dot sighting instrument with variable dots to giving the marksman additional options for sighting and/or aiding the marksman to sight more quickly and accurately on a target.

According to features of the present invention dots of different color are produced using different mirror coatings that differentially reflect different wavelengths of light from a single diode or several diodes of the same color, or from different color diodes. Dots at different positions on the image of the target view are obtained by spacing apart mirror coatings for reflecting light from a single diode, or by spacing apart several diodes, or a combination of both. Dots of different brightness on the image of the target view are obtained by spacing apart mirror coatings for reflecting light from a single diode so that light reflects from the near side and from the far side of the lens and so the far side reflected light is less bright on the image than the near side reflected light. Some embodiments of the present invention incorporate more than one or all of these features.

According to a specific embodiment of the present invention a reflex type luminous dot sighting instrument includes a housing containing an objective end window and ocular end window at opposite ends of the housing and defining an optical axis in between, an aperture at the objective end of the housing for admitting light from a target view along the optical axis, a source of light such as a light emitting diode (LED) and an inclined lens along the optical axis for reflecting light from the source while transmitting the target view light, so that the target view and the source are visible at the ocular end of the housing along the optical axis with the source image superimposed on the target view image and there are two reflecting interfaces on the lens producing two separate images of the source superimposed on the target view image.

In some embodiments the two separate images of the source superimposed on the target view image are different colors and/or different brightnesses of the same color. The separate images can be used by the marksman to sight on the target at different ranges and the position or the brightness or the color of the luminous dot can be representative of range to the target.

BRIEF DESCRIPTION OF THE DRAWINGS

FIG. 1A is an axial section view and FIG. 1B is an end view of an arrangement according to the invention for a luminous dot sighting instrument producing more than one dot and/or dots of different colors superimposed on the image of the target view produced by the instrument;

DESCRIPTION OF EMBODIMENTS OF THE INVENTION

Figure 2:
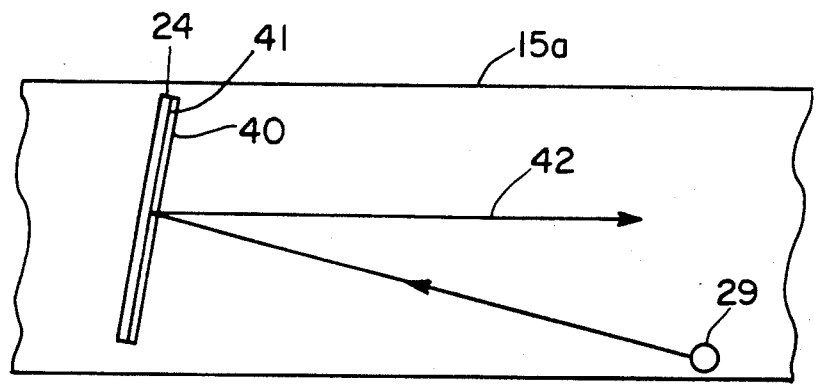
FIGS. 2 and 3 are partial axial section views showing embodiments of the luminous dot sighting instrument of FIG. 1 where the mirror coating on the tilted lens is on the near and far side, respectively, of the lens with respect to the light emitting diode of the instrument.

Embodiments of the present invention have in common that they can provide multiple dots of different colors at the same or at spaced apart points on the image of the target view. The different colors are obtained using different mirror coatings that differentially reflect different wavelengths of light from a single diode or several diodes of the same color, or from different color diodes. The spacing apart of the luminous dots on the image of the target view is obtained by spacing apart mirror coatings for reflecting light from a single diode, or by by spacing apart several diodes, or a combination of both.

General Structure of Reflex Luminous Dot Sighting Instrument

FIG. 1A is a schematic cross section view of a typical luminous dot sighting instrument 1 and a telescope attachment 2 which are detachably interconnected by means 3 including threads 4 whereby the rear portion of instrument 1 is screwed into the telescope.

The optical system of instrument 1 includes a lens system having a mirror and light source that may be a light emitting diode (LED) 29 energized by a battery 30 through an electronic circuit 31 contained in envelope 32. The instrument 1 is generally tubular and has a mounting attachment 33 for attachment to an accomodating holder 19 that is attached to a firearm. Means are provided for vertical and horizontal angular adjustment of the instrument with respect to the mounting attachment (in relation to the firearm) operative between the optical section 15 of the instrument and that part 17 which encompasses the optical system 15 so that angular adjustment of the optical section can be made to account for range and windage (elevation and azimuth).

As shown in FIG. 1A, the ocular end of tube 17 is connected at 20 via screw threads with rear tubular member 21a forming the rear part of the instrument and supporting the telescope 2 at connection 3 or an eyepiece (not shown), if the telescope is not used. Front tubular member 21b is screwed into the front end of 17 at 22 via screw threads and is closed at its front end, the objective end, by protective window 23.

Thus, tubular members 17, 21a and 21b form a composite continuous outer tube in which tubular housing 15a accommodating the optical system 15 is suspended so that the optical system is moveable for vertical and horizontal angular adjustment by means of two adjusting screws 23a and 23b along horizontal and vertical axes to adjust for windage and range, respectively, as shown also in FIG. 1B. At the front of tube 15a is carried tilted parabolic lens 24 that has semi-transparent mirror coatings 26 and 27 at its front and rear surfaces, respectively, according to one embodiment of the present invention.

The front end of tube 15a is pivotally supported by tube 17 at pivotal support 25 that acts as a universally articulating spring loaded suspension of the optical system 15. When the angular adjustment of tube 15a is changed by manipulating screws 23a or 23b, the optical system 15 is changed, the luminous dot incident upon a mirror coating of lens 24 is displaced from light emitting diode 29.

Near and Far Side Reflection And Color Selective Coatings

Figure 3:
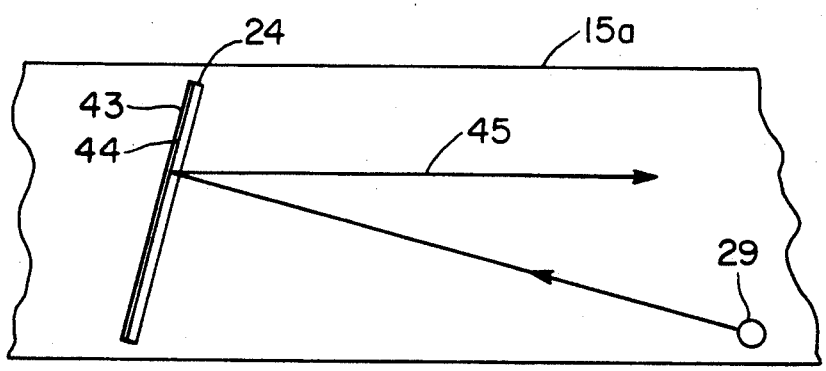

FIGS. 2 and 3 are partial axial section views showing embodiments where the mirror coating on the tilted lens is on the near and far side, respectively, of the lens with respect to the light emitting diode and the coating reflects a selected color so that the luminous dot on the image of the target view is that selected color.

In FIG. 2, the reflective coating 40 is on the surface 41 of tilted lens 24 nearest the source, LED 29, and so the reflection 42 is from the "near side interface" of the tilted lens and the coating reflects only a particular color of the total spectrum emitted by LED 29. As a result, the luminous dot on the image of the target view is that particular color.

In FIG. 3, the reflective coating 43 is on the surface 44 of tilted lens 24 farthest from the source, LED 29, and so the reflection 45 is from the "far side interface" of the tilted lens and so the light from LED 29 is of reduced brightness at the image as compared with light reflected from the near side interface, because it has traveled twice through lens 24. In addition, coating 43 may also selectively reflect a particular color and so the dot on the image would be that particular color.

Compound Tilted Lens With Mirror Coating Between Lenses

Figure 4:
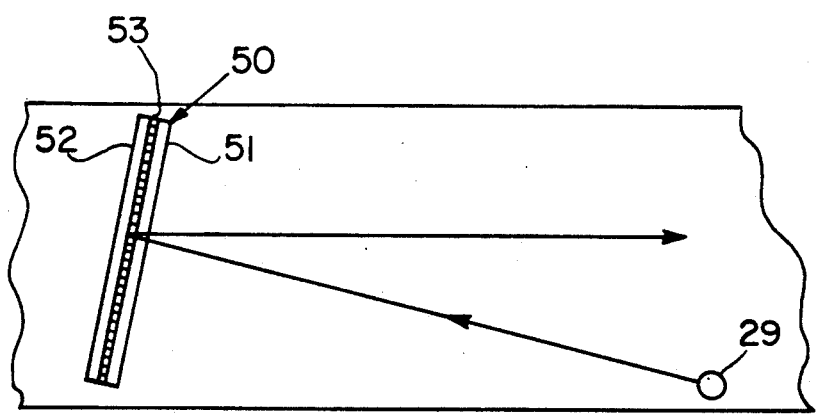
FIG. 4 is a partial axial section view showing an embodiment of the luminous dot sighting instrument of FIG. 1 where the tilted lens is a compound lens and the mirror coating thereon is between lenses thereof.

FIG. 4 is a partial axial section view showing an embodiment where the tilted lens 50 is a compound lens comprising two or more lens bodies 51 and 52 of which adjacent surfaces are congruent and contiguous with mirror coating 53 therebetween.

Two Mirror Coatings Spaced Apart To Provide Two Luminous Dots

Figure 5:
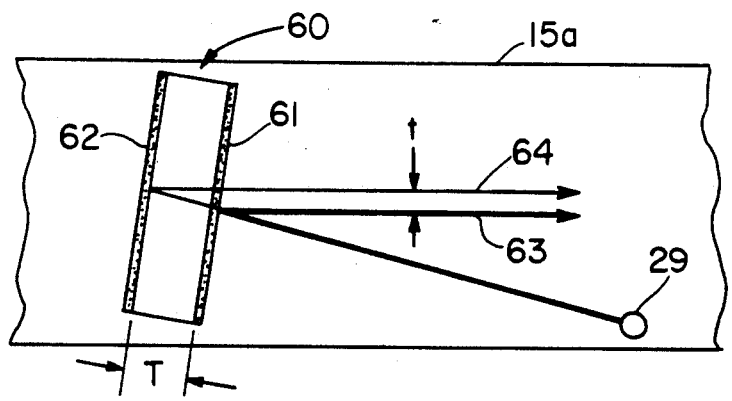
FIG. 5 is a partial axial section view showing an embodiment of the luminous dot sighting instrument of FIG. 1 where the tilted lens is of predetermined thickness and mirror coating are provided on the near and far sides, respectively, of the lens with respect to the light emitting diode, producing two reflections of the diode light along two parallel spaced apart light paths and so producing two spaced apart luminous dots of different brightness on the image of the target view.

FIG. 5 is a partial axial section view showing an embodiment where the tilted lens 60 is of predetermined thickness T and mirror coating 61 and 62 are provided on the near and far sides, respectively, of the lens with respect to the light emitting diode 29, producing two reflections of the diode light along two parallel spaced apart a dimension t, light paths 63 and 64, and so producing two spaced apart luminous dots of different brightness on the image of the target view;

Compound Tilted Lens With Three Mirror Coatings

Figure 6:
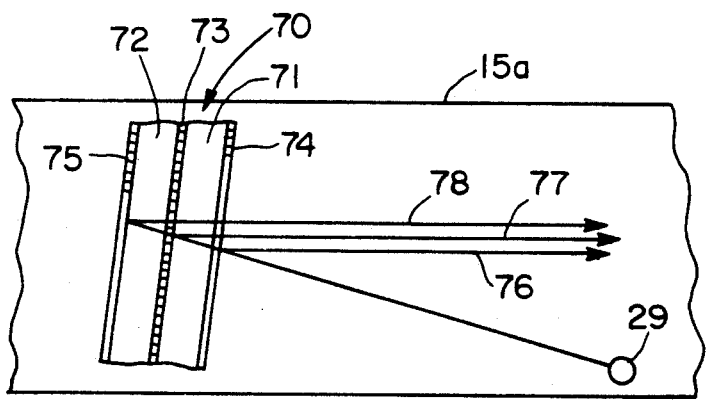
FIG. 6 is a partial axial section view showing an embodiment of the luminous dot sighting instrument of FIG. 1 where the tilted lens is a compound lens and mirror coatings are provided thereon on the near and far side, respectively, of the lens with respect to the light emitting diode and between lenses thereof, producing three reflections of the diode light along three parallel spaced apart light paths and so producing three spaced apart luminous dots of differing brightness on the image of the target view.

FIG. 6 is a partial axial section view showing an embodiment where the tilted lens 70 is a compound lens comprising two or more lens bodies 71 and 72 of which adjacent surfaces are congruent and contiguous with mirror coating 73 therebetween and other mirror coatings 74 and 75 are provided thereon on the near and far side, respectively, of the lenses 71 and 72 with respect to the light emitting diode, producing three reflections of the diode light along three parallel spaced apart light paths 76, 77 and 78, and so producing three spaced apart luminous dots of differing brightness and/or colors on the image of the target view;

Two LED's And Two Mirror Coatings on The Tilted Lens

Figure 7:
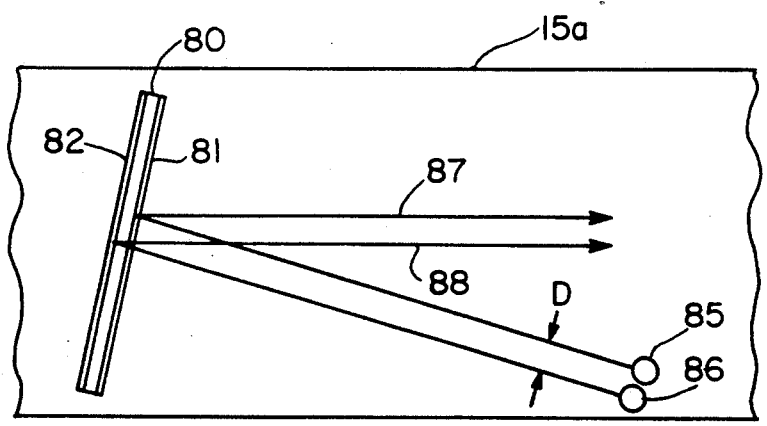
FIG. 7 is a partial axial section view showing an embodiment of the luminous dot sighting instrument of FIG. 1 where mirror coating of different materials are provided on the near and far sides, respectively, of the lens with respect to two side by side light emitting diode, producing a reflection of one diode from the near side coating and a reflection of the other diode from the far side coating, the two reflections being of different colors along two parallel spaced apart light paths and so producing two spaced apart luminous dots of different color on the image of the target view.
Figure 8:
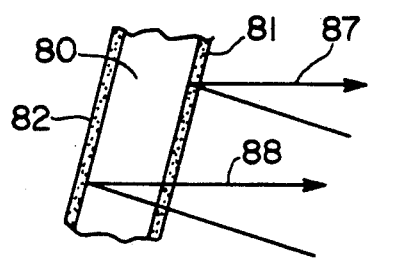
FIG. 8 is a greatly enlarged view of part of FIG. 8 showing the reflections of light from the two different diodes, one from the near side and the other from the far side of the lens.

FIG. 7 is a partial axial section view showing an embodiment where mirror coating 81 and 82 of different materials are provided on the near and far sides 83 and 84, respectively, of the tilted lens 80 with respect to two side by side light emitting diodes 85 and 86, spaced apart a dimension D, producing a reflection of one diode from the near side coating and a reflection of the other diode from the far side coating, the two reflections being of different colors along two parallel spaced apart light paths 87 and 88, respectively, and so producing two spaced apart luminous dots of different color on the image of the target view;

FIG. 8 is a greatly enlarged view of part of FIG. 7 showing the reflections of light from the two different diodes, one from the near side and the other from the far side of the tilted lens 80.

Two LED's And One Mirror Coating On The Tilted Lens

Figure 9:
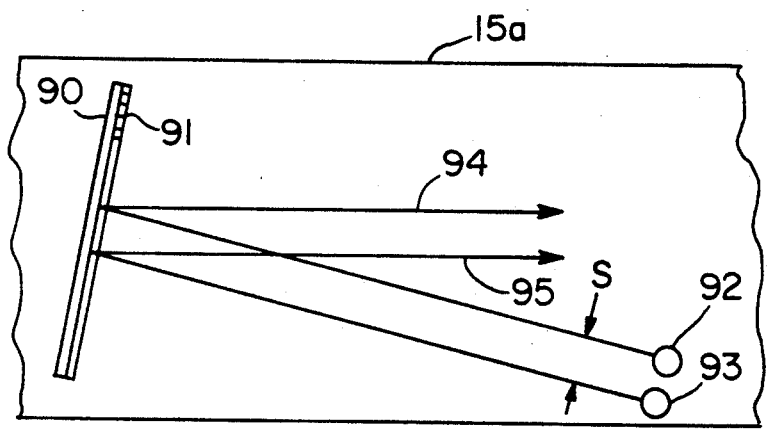
FIG. 9 is a partial axial section view showing an embodiment where a single mirror coating is provided on the near or the far side of the lens and two side by side, spaced apart light emitting diodes are provided, producing a reflection of each diode from the coating, the two reflections being along two parallel spaced apart light paths and so producing two spaced apart luminous dots of on the image of the target view, the spacing between the dots on the image being determined by the spacing between the diodes.

FIG. 9 is a partial axial section view showing an embodiment where a single mirror coating 91 is provided on the near or the far side of the tilted lens 90 and two side by side, spaced apart light emitting diodes 92 and 93 are provided, producing a reflection of each diode from the coating, the two reflections being along two parallel spaced apart light paths 94 and 95, respectively, and so producing two spaced apart luminous dots of on the image of the target view, the spacing between the dots on the image being determined by the spacing S between the diodes.

Two LED's Of Different Color And One Mirror Coating On The Tilted Lens

Figure 10:
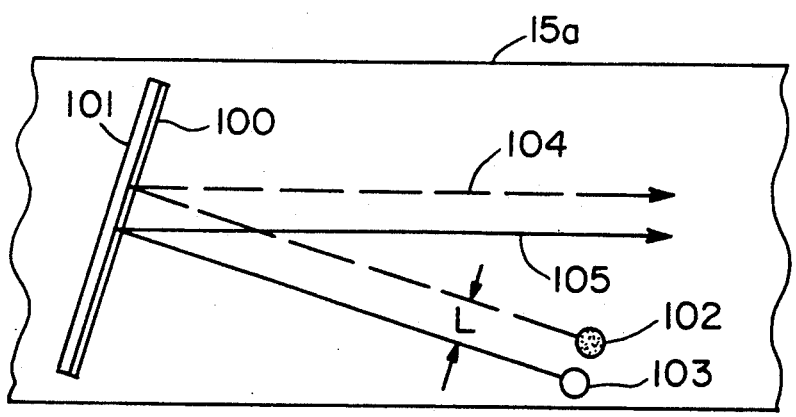
FIG. 10 is a partial axial section view showing an embodiment where a single mirror coating is provided on the near or the far side of the lens and two side by side, spaced apart light emitting diodes of different color are provided, producing a reflection of each diode from the coating, the two reflections being of different colors along two parallel spaced apart light paths and so producing two spaced apart luminous dots of different color on the image of the target view, the spacing between the dots on the image being determined by the spacing between the diodes.

FIG. 10 is a partial axial section view showing an embodiment where a single mirror coating 100 is provided on the near or the far side of the lens 101 and two side by side, spaced apart light emitting diodes 102 and 103 of different color are provided, producing a reflection of each diode from the coating. The two reflections are, of course, of different colors along two parallel spaced apart light paths 104 and 105 and so produce two spaced apart luminous dots of different color on the image of the target view. The color of the dots and the spacing between the dots on the image are thus determined by the color of the diodes and the spacing dimension L between the diodes.

CONCLUSION

While the invention described herein is described in connection with several embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

I claim:

1. A sighting instrument comprising,
   (a) a housing containing an objective end and an ocular end and defining an optical axis in between,
   (b) an aperture at said objective end of said housing for admitting light from a target view along said optical axis,
   (c) a source of light,
   (d) mean along said optical axis for reflecting light from said source while transmitting said target view light,
   (e) whereby images of said target view and said source are visible at said ocular end of said housing along said optical axis with said source image superimposed on said target view image and
   (f) said means for reflecting light from said source includes reflecting interfaces that reflect different color light producing separate images of said source of different color superimposed on said target view image.

2. A sighting instrument as in claim 1,
   (a) said reflecting interfaces reflect different color light from said source light along different light paths,
   (b) whereby said separate images of said source of different color superimposed on said target view image of different color are produced.

3. A sighting instrument as in claim 1,
   (a) said reflecting interfaces reflect different amounts of different color light,
   (b) whereby said separate images of said source superimposed on said target view image are different colors and brightness.

4. A sighting instrument as in claim 1 wherein two sources of light are provided and
   (a) said two sources of light are of different color light,
   (b) whereby separate images of said sources superimposed on said target view image are different colors.

5. A sighting instrument as in claim 4,
   (a) said reflecting interfaces reflect said source light along different light paths,
   (b) whereby separate images of said sources superimposed on said target view image are produced.

6. In a luminous dot sighting instrument having a housing containing objective lens means and ocular lens means at opposite ends of said housing and defining an optical axis in between, an aperture at said objective lens end of said housing for admitting light from a target view to said objective lens means along said optical axis, a source of light, means along said optical axis for reflecting light from said source while transmitting said target view light, so that said target view and said source are visible at said ocular lends end of said housing along said optical axis with said source image superimposed on said target view image, the improvement comprising,
   (a) said means for reflecting light from said source includes reflecting interfaces that reflect different color light producing separate images of said source of different color superimposed on said target view image.

7. A sighting instrument as in claim 6,
   (a) said reflecting interfaces reflect different color light from said source light along different light paths,
   (b) whereby said separate images of said source of different color superimposed on said target view image are produced.

8. A sighting instrument as in claim 6,
   (a) said reflecting interfaces reflect different amounts of different color light,
   (b) whereby said separate images of said source of different color superimposed on said target view image are different brightness.

9. A sighting instrument as in claim 6 wherein two sources of light are provided and
   (a) said two sources of light are of different color light,
   (b) whereby separate images of said sources superimposed on said target view image are different colors.

10. A sighting instrument as in claim 9,
    (a) said reflecting interfaces reflect said source light along different light paths,
    (b) whereby separate images of said sources superimposed on said target view image are produced.

11. In a luminous dot sighting instrument having a housing containing objective lens means and ocular lens means at opposite ends of said housing and defining an optical axis in between, an aperture at said objective lens end of said housing for admitting light from a target view to said objective lens means along said optical axis, a source of light, means along said optical axis for reflecting light from said source while transmitting said target view light, so that said target view and said source are visible at said ocular lens end of said housing along said optical axis with said source image superimposed on said target view image, the improvement comprising,
    (a) two of said sources of light of different color are included and
    (b) said means for reflecting light from said different color sources includes reflecting interfaces that reflect said different color light producing images of said sources of different color superimposed on said target view image.

* * * * *